(12) United States Patent
Yu et al.

(10) Patent No.: US 9,538,276 B2
(45) Date of Patent: Jan. 3, 2017

(54) EARPHONE CONNECTION INTERFACE, TERMINAL INCLUDING THE SAME, AND METHOD OF OPERATING TERMINAL

(71) Applicant: Samsung Electronics Co., Ltd., Gyeonggi-do (KR)

(72) Inventors: Garam Yu, Seoul (KR); Minwoo Oh, Gyeonggi-do (KR); Byounghee Lee, Gyeonggi-do (KR); Jaekyu Lee, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 454 days.

(21) Appl. No.: 13/975,595

(22) Filed: Aug. 26, 2013

(65) Prior Publication Data

US 2014/0064512 A1    Mar. 6, 2014

(30) Foreign Application Priority Data

Aug. 29, 2012  (KR) ........................ 10-2012-0094597

(51) Int. Cl.
```
H04R 1/10      (2006.01)
H01R 24/58     (2011.01)
H04M 1/725     (2006.01)
H04M 1/60      (2006.01)
```

(52) U.S. Cl.
CPC ............ *H04R 1/1041* (2013.01); *H01R 24/58* (2013.01); *H04M 1/72527* (2013.01); *H04M 1/6058* (2013.01); *H04R 2201/107* (2013.01); *H04R 2420/05* (2013.01); *H04R 2420/09* (2013.01)

(58) Field of Classification Search
CPC ......... H04R 1/10; H04R 1/1041; H04R 24/58; H04R 2201/107; H04R 2420/05; H04R 2420/09; H04M 1/72527; H04M 1/6058
USPC ........................................................... 381/74
See application file for complete search history.

(56) References Cited

U.S. PATENT DOCUMENTS

| | | | |
|---|---|---|---|
| 6,397,087 B1 | 5/2002 | Kim et al. | |
| 7,187,775 B2 * | 3/2007 | Fujita | H04R 5/04 381/11 |
| 2008/0137896 A1 * | 6/2008 | Tsen | H04R 1/1041 381/370 |
| 2008/0166003 A1 * | 7/2008 | Hankey | H01H 9/0228 381/370 |

(Continued)

FOREIGN PATENT DOCUMENTS

| | | |
|---|---|---|
| EP | 2 312 813 A1 | 4/2011 |
| KR | 10-2006-0113036 A | 11/2006 |

(Continued)

*Primary Examiner* — Thomas Alunkal
(74) *Attorney, Agent, or Firm* — Cha & Reiter, LLC

(57) ABSTRACT

An earphone connection interface, a terminal including the same, and a method of operating the terminal are provided. The earphone connection interface includes: a terminal left terminal, a terminal right terminal, a terminal ground terminal, an earphone detection terminal, and a terminal microphone terminal disposed sequentially along an inner wall of a cylindrical groove and an ear microphone bias voltage source electrically connected to the terminal microphone terminal; and a capacitor electrically connected to the terminal microphone terminal through a switch element.

26 Claims, 12 Drawing Sheets

(56) References Cited

U.S. PATENT DOCUMENTS

| | | | | |
|---|---|---|---|---|
| 2008/0242378 | A1* | 10/2008 | Lowles | H04M 1/6058 |
| | | | | 455/575.2 |
| 2009/0180659 | A1* | 7/2009 | Sander | H04M 1/05 |
| | | | | 381/384 |
| 2009/0296952 | A1* | 12/2009 | Pantfoerder | H04M 1/6058 |
| | | | | 381/74 |
| 2010/0303255 | A1 | 12/2010 | Im et al. | |
| 2011/0085673 | A1* | 4/2011 | Lee | H01R 24/58 |
| | | | | 381/74 |
| 2011/0091063 | A1 | 4/2011 | Lee | |
| 2011/0135109 | A1* | 6/2011 | Park | H01R 13/641 |
| | | | | 381/74 |
| 2011/0237131 | A1* | 9/2011 | Fields | H01R 13/7039 |
| | | | | 439/620.21 |
| 2011/0268289 | A1* | 11/2011 | Baranwal | H03F 3/181 |
| | | | | 381/74 |
| 2012/0140950 | A1 | 6/2012 | Poulsen | |
| 2013/0158919 | A1* | 6/2013 | Shah | H04R 5/04 |
| | | | | 702/64 |

FOREIGN PATENT DOCUMENTS

| | | |
|---|---|---|
| KR | 10-2007-0022442 A | 2/2007 |
| KR | 10-2010-0128885 A | 12/2010 |
| KR | 10-2011-0042455 A | 4/2011 |

\* cited by examiner

EARPHONE CONNECTION INTERFACE, TERMINAL INCLUDING THE SAME, AND METHOD OF OPERATING TERMINAL

CROSS RELATED APPLICATION

This application claims the benefit under 35 U.S.C. §119 (a) of a Korean patent application filed on Aug. 29, 2012 in the Korean Intellectual Property Office and assigned Serial No. 10-2012-0094597, the entire disclosure of which is hereby incorporated by reference in its entirety.

BACKGROUND

Field of the Invention

The present invention relates to operation of an earphone device, and more particularly, to that an earphone connection interface, a terminal including the same, and a method of operating the terminal that can eliminate tick, pop or click noises which occur during the process of releasing an earphone device from the earphone connection interface.

Description of the Related Art

Nowadays, mobile terminals are widely used based on their capability to provide the user with increased mobility. Particularly, a mobile communication terminal that can perform audio dedicated communication while moving is a very popular mobile terminal which most people today use. The mobile communication terminal may also have various functions in addition to providing a function of transmitting and receiving communication information between speakers as a major function. For example, a conventional mobile terminal may have an MP3 function corresponding to an audio file reproduction function and an image collection function corresponding to a digital camera that can collect an image or a function corresponding to a multi media playback. Further, a conventional mobile terminal has a function that can perform execution of a mobile game or an arcade game.

In order to not disturb another person in an audio output process or in order for a single user alone to enjoy audio listening, a conventional mobile terminal provides an earphone system. Accordingly, the user can perform music listening, multimedia playback or broadcasting listening regardless of a time and a place using an earphone device. Here, as a plug of the earphone device is inserted into a cylindrical hole-shaped earphone connection interface of a terminal, a conventional earphone system adapts a system in which the terminal senses connection of the earphone device and activates the appropriate control and sound output functions. Particularly, for support of a microphone for a 4-way earphone device, a conventional earphone system provides a microphone terminal in an earphone connection interface of the terminal and provides a predetermined bias voltage to the microphone terminal, thereby supporting a microphone operation of the connected 4-way earphone device.

However, during a process of releasing the earphone device, because a bias voltage which is supplied to a microphone terminal of the earphone connection interface is maintained during the releasing process, the bias voltage that is provided to support microphone operation induces a tick noise to the earphone device. Particularly, while an earphone left terminal and an earphone right terminal formed in the plug of the earphone device are removed from an earphone connection interface, the earphone left terminal and the earphone right terminal contact with the microphone terminal while being removed and thus the bias voltage is sequentially induced to each of the earphone left terminal and the earphone right terminal and is thus output as noise to each of the earphone output units. Because such tick noise is generally annoying or irritating which a user or a person dislikes, many users experience inconvenience and annoyance when releasing the earphone device.

SUMMARY

The present invention has been made in view of the above problems, and provides an earphone connection interface, a terminal including the same, and a method of operating the terminal that can prevent a tick noise from occurring, when an earphone device is released from the earphone connection interface.

In accordance with an aspect of the present invention, an earphone connection interface includes: a terminal left terminal, a terminal right terminal, a terminal ground terminal, an earphone detection terminal, and terminal microphone terminal disposed sequentially along an inner wall of a cylindrical groove at predetermined intervals and a switch element for selectively converting an electrical potential of the terminal microphone terminal the switch element having a control terminal.

In accordance with another aspect of the present invention, a terminal for operating an earphone includes: an earphone connection interface including a terminal left terminal, a terminal right terminal, a terminal ground terminal, an earphone detection terminal, and a terminal microphone terminal disposed sequentially along an inner wall of a cylindrical groove, an ear microphone bias voltage source connected to the terminal microphone terminal, and a ground terminal or a capacitor connected to the terminal microphone terminal through a switch element; and a controller for controlling, an earphone function support of the inserted earphone device when an earphone device is inserted into the earphone connection interface, and controlling to stop an earphone function support of the earphone device, when insertion of the earphone device is released.

In accordance with another aspect of the present invention, a method of operating a terminal includes: controlling a switch element for controlling to electrically connect a terminal microphone terminal with a capacitor, the terminal microphone terminal disposed along an inner wall of a cylindrical groove of the earphone connection interface, the switch element controlling to electrically connect a terminal with the capacitor when an earphone device is inserted into the earphone connection interface; and controlling the switch element to electrically disconnect the terminal microphone terminal and the capacitor or electrically ground the terminal microphone terminal, when insertion of the earphone device into the earphone connection interface is released.

BRIEF DESCRIPTION OF THE DRAWINGS

The above features and advantages of the present invention will be more apparent from the following detailed description in conjunction with the accompanying drawings, in which.

DETAILED DESCRIPTION

Figure 1:
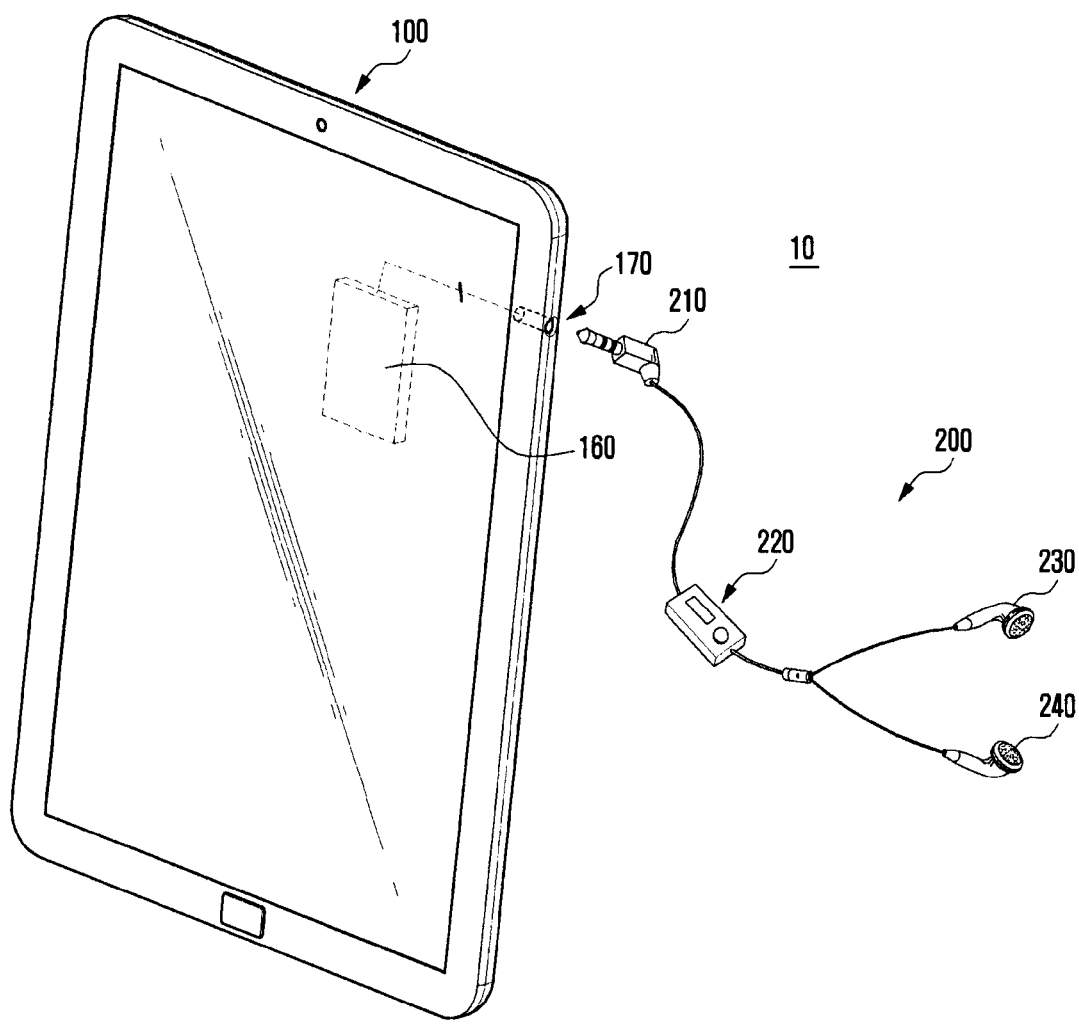
FIG. 1 is a perspective view illustrating a configuration of an earphone operation system according to an exemplary embodiment of the present invention.

Hereinafter, exemplary embodiments of the present invention are described in detail with reference to the accompanying drawings to assist in a comprehensive understanding of exemplary embodiments of the invention as defined by the claims and their equivalents. The same reference numbers are used throughout the drawings to refer to the same or like parts. The views in the drawings are schematic views only, and are not intended to be to drawn to scale or be correctly proportioned. In the following description, detailed descriptions of well-known functions or configurations will be omitted since they would unnecessarily obscure the subject matters of the present invention by a person of ordinary skill in the art with unnecessary detail of the well-known functions and structures. Also, the terms used herein are defined according to the functions of the present invention. Thus, the terms may vary depending on users' or operators' intentions or practices. Therefore, the terms used herein should be understood based on the descriptions made herein in view of the ordinary level of skill in the art. The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

Figure 2:
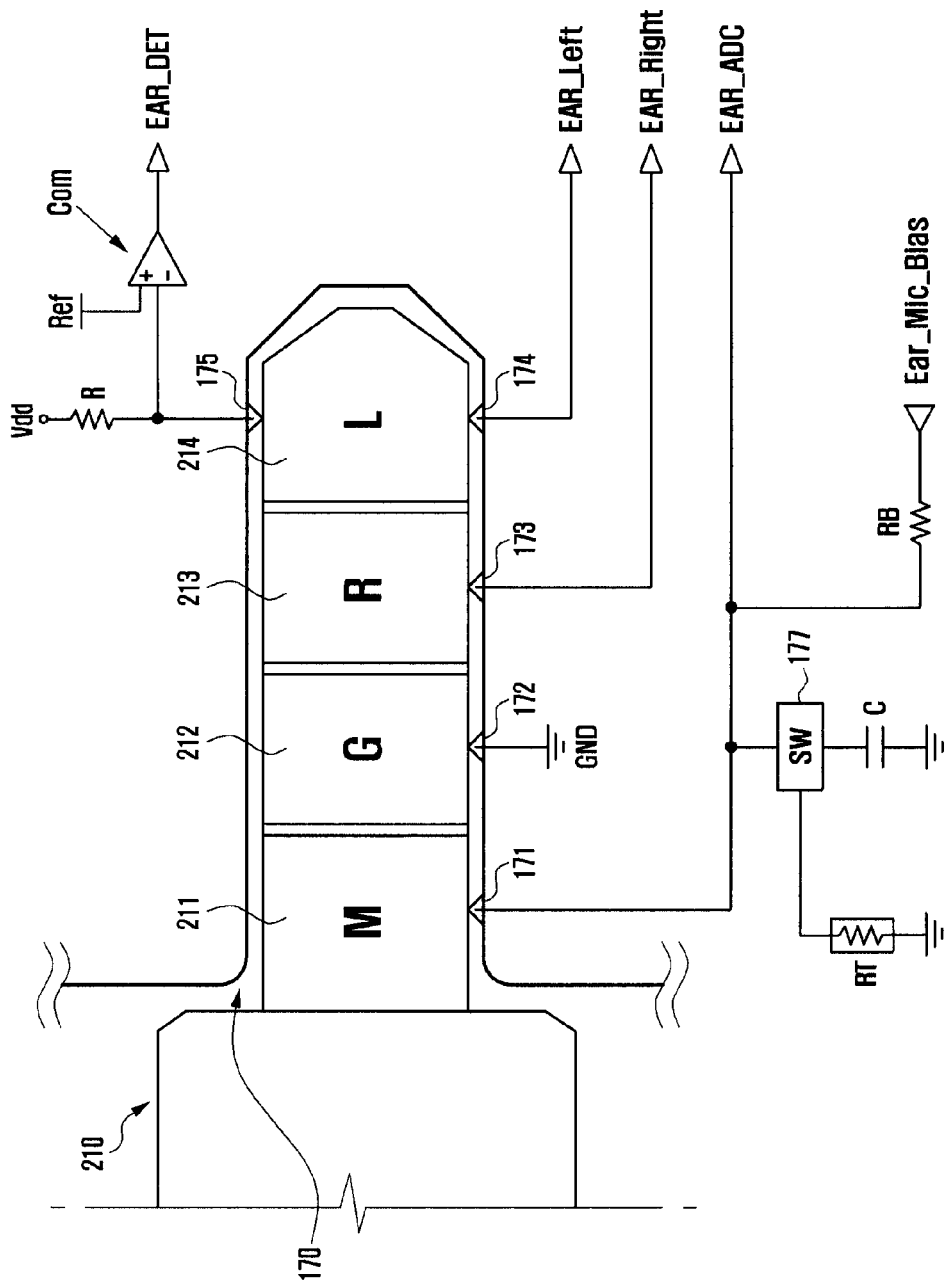
FIG. 2 is a diagram illustrating connections in a state in which an earphone plug is inserted into an earphone connection interface of FIG. 1.

FIG. 1 is a perspective view illustrating a configuration of an earphone operation system 10 according to an exemplary embodiment of the present invention, and FIG. 2 is a diagram illustrating connections for a state in which an earphone device 200 is inserted into an earphone connection interface 170 in the earphone operation system 10 of FIG. 1.

Referring to FIGS. 1 and 2, the earphone operation system 10 according to the present exemplary embodiment includes a terminal 100 and the earphone device 200.

In the earphone operation system 10 according to the present exemplary embodiment having such a configuration, when an earphone plug 210 of the earphone device 200 is inserted into the earphone connection interface 170 of the terminal 100, a controller 160 of the terminal 100 recognizes the inserted earphone plug 210 and controls and supports an earphone function. In this case, when the inserted earphone device 200 is a 4-way earphone device, in order to support a microphone function of the earphone device 200, the terminal 100 provides a voltage of an ear microphone bias voltage source Ear_Mic_Bias to the earphone device 200 through the earphone connection interface 170. When the earphone device 200 is released from the earphone connection interface 170, the terminal 100 grounds a terminal microphone terminal 171 in which the voltage of the ear microphone bias voltage source Ear_Mic_Bias is provided and thus in a process of releasing the earphone device 200, even if an earphone left terminal 214 and an earphone right terminal 213 contact with the terminal microphone terminal 171, the terminal 100 enables tick noise not to occur.

The earphone device 200 includes the cylindrical pillar-shaped earphone plug 210, a signal line connected to the earphone plug 210, earphone output units 230 and 240 disposed at an end portion of the signal line, and an ear microphone 220, as shown in FIG. 1. The earphone output units 230 and 240 include the earphone left output unit 240 and the earphone right output unit 230. The earphone device 200 is classified into a 3-way and a 4-way according to whether a microphone is supported.

In the present exemplary embodiment, a 4-way earphone device is described. The 4-way earphone device 200 has four terminals, as shown in FIG. 2. That is, the earphone device 200 has the earphone plug 210 including the earphone left terminal 214, the earphone right terminal 213, an earphone ground terminal 212, and an earphone microphone terminal 211. In the earphone device 200 according to the present exemplary embodiment of such a structure, the earphone left terminal 214 is disposed at a tip portion of the earphone plug 210, and the earphone right terminal 213, the earphone ground terminal 212, and the earphone microphone terminal 211 are sequentially disposed. Alternatively, in the earphone device 200, the earphone left terminal 214 may be disposed at a tip portion of the earphone plug 210 and the earphone right terminal 213, earphone microphone terminal 211, and earphone ground terminal 212 may be sequentially disposed. An insulating layer for insulating terminals may be provided between terminals of the earphone device 200 for electrically isolating each terminal. In the earphone device 200 of the above-described structure, the earphone left terminal 214 is first inserted into an inlet portion of the earphone connection interface 170 provided in a cylindrical groove form, and when insertion of the earphone left terminal 214 is completely released and withdrawn from the earphone connection interface 170, the earphone left terminal 214 is finally separated from the inlet portion.

The terminal 100 provides the earphone connection interface 170 for inserting the earphone plug 210 of the earphone device 200 at one side of a side surface or located at a specific position according to a designer's intention and supports an earphone function accordingly upon insertion of the earphone device 200. When an earphone function is supported, the terminal 100 turns off an external speaker function provided in the terminal 100 according to a design method and converts an audio signal path to alternately output an audio signal generated in the terminal 100 through the earphone device 200. Further, when an earphone function is supported, the terminal 100 turns off a microphone function of the terminal 100 according to the pole number of the connected earphone device 200 and alternately supports a microphone function of the earphone device 200. Here, when a 3-way earphone device having no microphone module is inserted, the terminal 100 may be selectively operated according to a user function that activates a microphone function of the terminal 100. In this case, when the earphone device 200 including the ear microphone 220 such as a 4-way earphone device, is inserted, for operation of the ear microphone 220, the terminal 100 provides a voltage of the ear microphone bias voltage source Ear_Mic_Bias to the earphone device 200. When an earphone device that does not include the ear microphone 220 is inserted, such as a 3-way earphone device, the terminal 100 controls to stop voltage supply of the ear microphone bias voltage source.

When the earphone plug 210 is inserted into the earphone connection interface 170, a state shown in FIG. 2 may be formed. In more detail, the earphone left terminal 214, earphone right terminal 213, earphone ground terminal 212, and earphone microphone terminal 211 of the earphone plug 210 are connected to a terminal left terminal 174, a terminal right terminal 173, a terminal ground terminal 172, and the terminal microphone terminal 171 of the earphone connection interface 170, respectively. The terminal left terminal 174 is connected to a left side port Ear_Left of the controller 160, and the terminal right terminal 173 is connected to a terminal right side port Ear_Right of the controller 160. The terminal microphone terminal 171 may be connected to an Ear_ADC port of the controller 160 or to the ear microphone bias voltage source Ear_Mic_Bias.

Further, the earphone left terminal 214 of the earphone plug 210 is electrically connected to the earphone detection terminal 175 provided at the earphone connection interface 170. Here, an earphone detection terminal 175 may be connected to a comparator Com, and the comparator Com may be connected to the controller 160 or to the controller 160 through a general purpose input/output (GPIO) port (not shown). A reference voltage Ref may be provided to the comparator Com. Accordingly, the controller 160 detects an output change of the comparator Com, i.e., an electrical change of the earphone detection terminal 175, thereby determining whether the earphone device 200 is connected. In order to detect an electrical change according to a connection of the earphone device 200, a circuit including a pull-up voltage Vdd and a pull-up resistor R is connected to the earphone detection terminal 175. That is, in the earphone detection terminal 175, the pull-up voltage Vdd is provided through the pull-up resistor R to maintain a predetermined potential, and the earphone left terminal 214 contacts with the earphone detection terminal 175 according to insertion of the earphone device 200 and thus an electrical change may occur. The earphone detection terminal 175 transfers such an electrical change provided by the earphone device 200 upon insertion to the controller 160, thereby notifying insertion of the earphone device 200.

When the earphone device 200 is separated from the earphone connection interface 170, the earphone left terminal 214 of the earphone device 200 releases an electrical connection to the earphone detection terminal 175 and no longer provides an electrical change. Therefore, a pull-up voltage provided to the earphone detection terminal 175 is transferred to an input of the comparator Com, and thus the controller 160 recognizes release of the earphone device 200 through an output change of the comparator Com.

The terminal microphone terminal 171 is connected to the controller 160 to transfer a voltage of an ear microphone bias voltage source for operating the ear microphone 220 of the earphone device 200 to the earphone device 200. A circuit for transferring a key interruption signal transferred from the earphone device 200 including the ear microphone 220 and a circuit for converting a change of a signal transferred to the terminal microphone terminal 171 to a digital signal and for transferring the digital signal to the controller 160 may be connected to the terminal microphone terminal 171. Particularly, a circuit including a switch element 177, capacitor C, and tuning resistor RT may be connected to the terminal microphone terminal 171. Here, the tuning resistor RT may be omitted according to a designer's intention. Alternatively, only the switch element 177 and the capacitor C may be connected to the terminal microphone terminal 171.

The switch element 177 may be controlled by the controller 160 or may be connected to the earphone detection terminal 175 or an output terminal of the comparator Com to turn on or turn off by a voltage formed in the earphone detection terminal 175 or an output of the comparator Com. For this, a signal line for controlling the switch element 177 may be further formed between a control terminal of the switch element 177 and the controller 160. Alternatively, a signal line for controlling the switch element 177 may be further formed between a control terminal of the switch element 177 and an output terminal of the comparator Com.

In a state in which the 4-way earphone device 200 is connected to the earphone connection interface 170, the switch element 177 connects the capacitor C and the terminal microphone terminal 171. In this case, the capacitor C performs a function of removing noise of a signal transferred to the terminal microphone terminal 171 in the microphone 220 of the earphone device 200. While a voltage of the ear microphone bias voltage source Ear_Mic_Bias is provided to the terminal microphone terminal 171, the capacitor C charges a predetermined charge amount. A bias resistor RB for stability of power supply is connected between the ear microphone bias voltage source Ear_Mic_Bias and the terminal microphone terminal 171.

While the earphone device 200 is separated from the earphone connection interface 170, the switch element 177 switches to connect the terminal microphone terminal 171 to the tuning resistor RT and a ground terminal. Accordingly, when the earphone device 200 is separated from the earphone connection interface 170, the terminal microphone terminal 171 may have a ground potential state. Therefore, because the terminal microphone terminal 171 of a ground potential state sequentially contacts with the earphone right terminal 213 and the earphone left terminal 214, an induced voltage does not occur in the earphone right terminal 213 and the earphone left terminal 214. Accordingly, a tick or click noise does not occur in the earphone device 200.

As described above, while the earphone device 200 is released from the earphone connection interface 170, the earphone operation system 10 according to an exemplary embodiment of the present invention controls to convert potential of the terminal microphone terminal 171 to a ground potential and thus removes electric charges induced to the earphone device 200, thereby fundamentally removing or preventing a tick or click noise from occurring in either the right or left earphone by a corresponding induced charge.

Hereinafter, a connection release state of the earphone connection interface 170 of the earphone device 200 is described in detail with reference to FIGS. 3 and 4.

Figure 3:
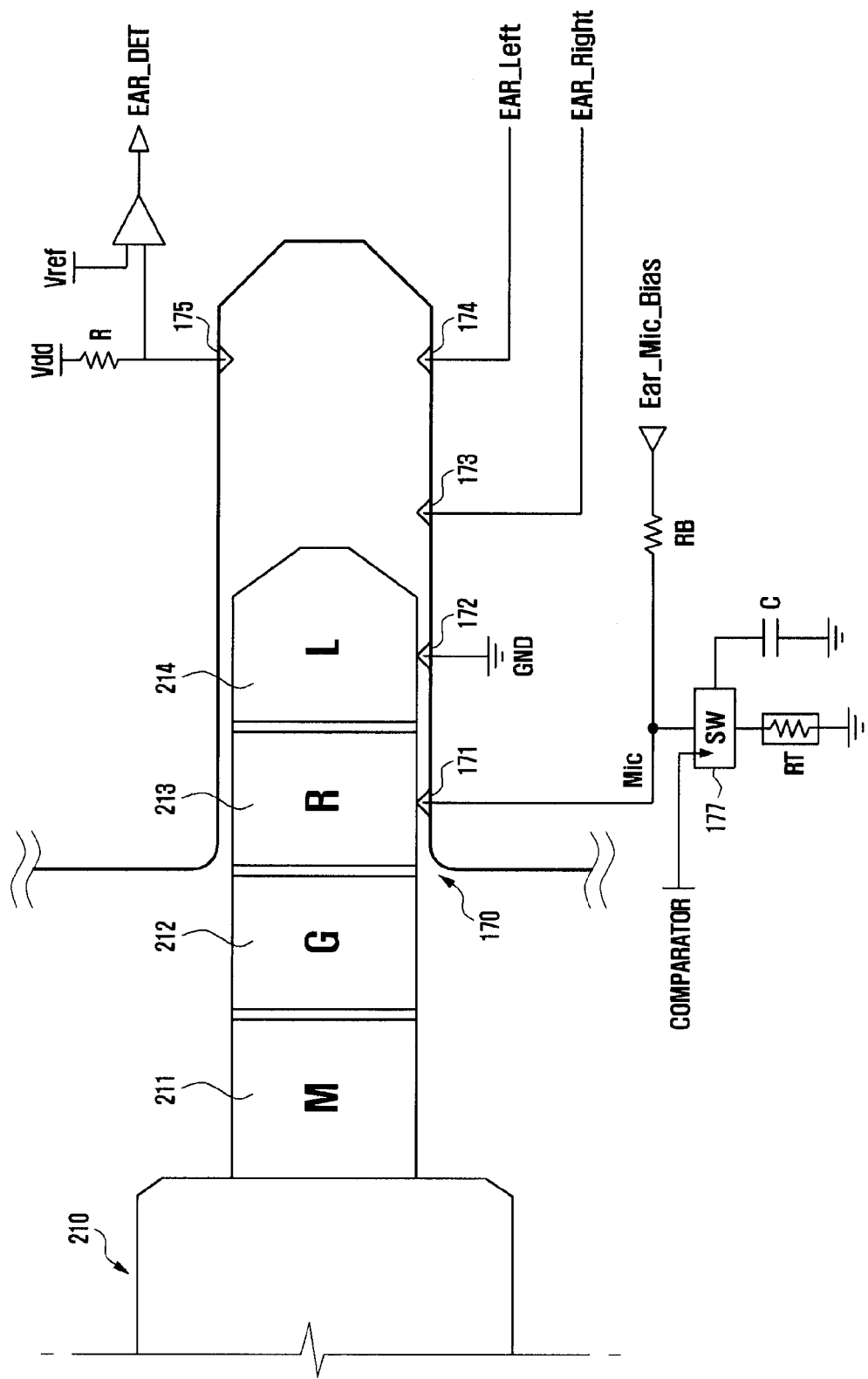
FIGS. 3 and 4 are diagrams illustrating connections in a state in which an earphone plug is inserted and released into and from an earphone connection interface of FIG. 1.
Figure 4:
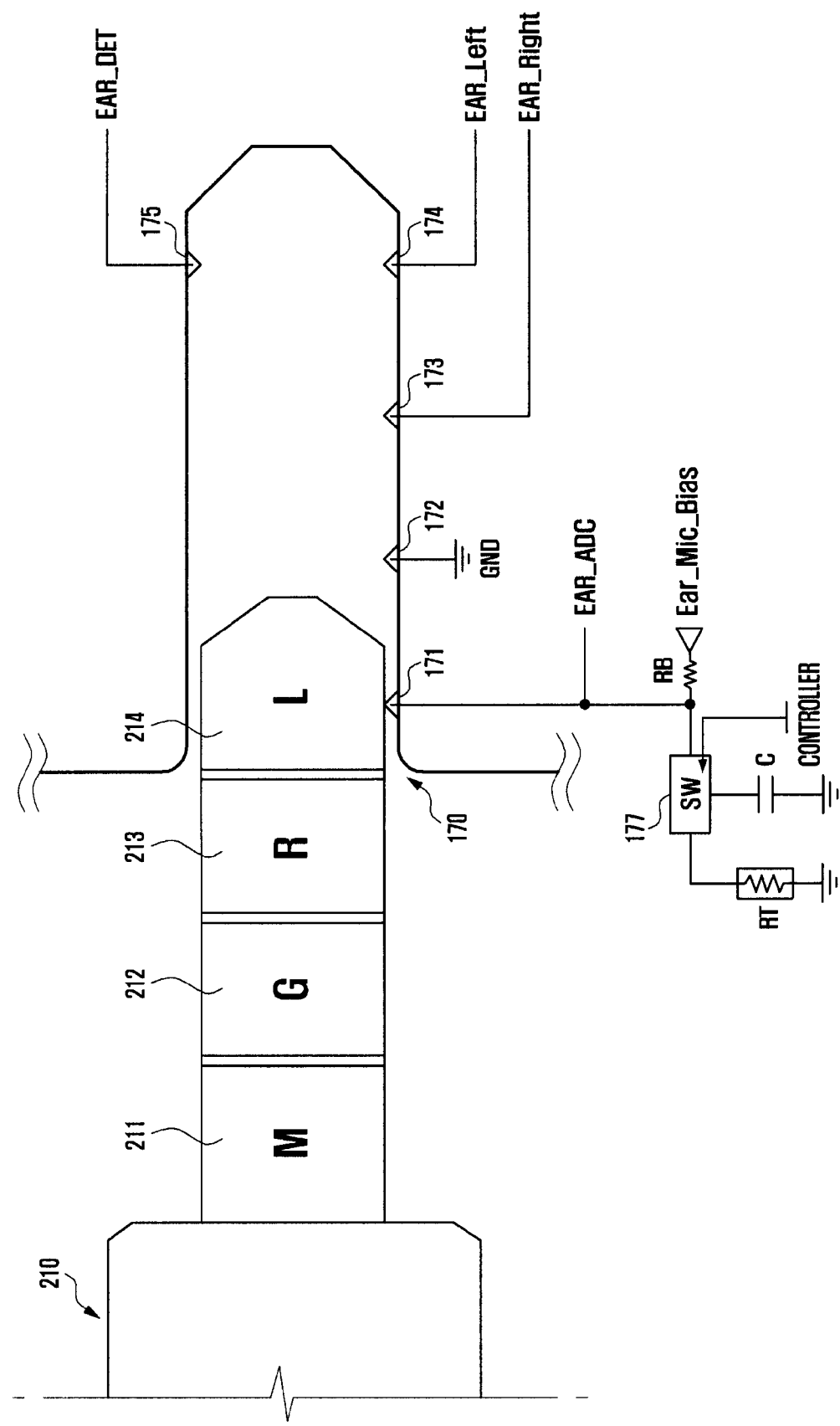

FIGS. 3 and 4 are diagrams illustrating a state in which the earphone device 200 is separated from the earphone connection interface 170 in an insertion state of FIG. 1.

Referring to FIGS. 3 and 4, the earphone connection interface 170 may be provided in a form, for example, of a cylindrical groove or channel shape corresponding to a shape of an earphone plug and in which the earphone plug 210 may be inserted. In the earphone connection interface 170, the earphone detection terminal 175 and the terminal left terminal 174 are disposed at a bottom of a groove, as described above. At a position separated by a predetermined gap from the terminal left terminal 174, terminal right terminal 173, terminal ground terminal 172, and terminal microphone terminal 171 may be each disposed. When the earphone plug 210 is inserted to a bottom of a groove of the earphone connection interface 170, the earphone left terminal 214 disposed at a tip of the earphone plug 210 contacts with the terminal left terminal 174 and the earphone detection terminal 175 disposed at the bottom of the groove. Here, in the earphone detection terminal 175, because the pull-up voltage Vdd is supplied through the pull-up resistor R, the pull-up voltage Vdd may drop according to insertion of the earphone device 200. That is, the earphone left terminal 214 of the earphone device 200 and the earphone detection terminal 175 are connected, the pull-up voltage Vdd provided to the earphone detection terminal 175 flows to the earphone left output unit 240 through the earphone detection terminal 175 and the earphone left terminal 214 and drops due to the intrinsic resistance of the earphone left output unit 240. Therefore, when a voltage formed in the earphone detection terminal 175 drops from a pull-up voltage to a predetermined voltage, the dropped voltage may be transferred to an input voltage of the comparator Com disposed between the earphone detection terminal 175 and the controller 160. When the input voltage drops from a pull-up voltage to a predetermined voltage, the comparator Com outputs an output signal different from a previously output signal. For example, when the comparator Com previously outputs a high signal, if the earphone left terminal 214 of the earphone plug 210 is connected to the earphone detection terminal 175 according to insertion of the earphone device 200, the earphone left terminal 214 transfers a low signal to the controller 160. Therefore, the controller 160 senses an electrical change of the earphone detection terminal 175 and determines whether the earphone device 200 is inserted.

If the earphone device 200 is inserted, the controller 160 converts an audio signal path. This is, the controller 160 intercepts an audio signal path including a speaker SPK and a microphone MIC provided to an audio processor of the terminal 100 and controls to form audio signal path including the ear microphone 220 and the right and left earphone output units 230 and 240 of the earphone device 200 connected to the earphone connection interface 170. That is, the controller 160 forms an audio signal path including the terminal left terminal 174, earphone left terminal 214, and earphone left output unit 240 and forms an audio signal path including the terminal right terminal 173, earphone right terminal 213, and earphone right output unit 230, thereby supporting an audio signal output.

When an electrical change of the earphone detection terminal 175 occurs, the controller 160 supplies a voltage of the ear microphone bias voltage source Ear_Mic_Bias to the terminal microphone terminal 171. Here, when a portion contacting with the terminal microphone terminal 171 is connected to a 3-way earphone formed with a ground terminal, the controller 160 senses a voltage change of the terminal microphone terminal 171 and determines that a 3-way earphone is connected. In this case, the controller 160 controls not to supply a voltage of the ear microphone bias voltage source Ear_Mic_Bias to the terminal microphone terminal 171. Further, the controller 160 controls to selectively operate a microphone included in an audio processor of the terminal 100 according to a presently activated user function.

When the controller 160 supplies a voltage of the ear microphone bias voltage source, Ear_Mic_Bias to the terminal microphone terminal 171 and detects drop of a predetermined voltage according to a connection of the 4-way earphone device 200, the controller 160 determines a connection of the 4-way earphone device 200 and controls to continue to supply a voltage of the ear microphone bias voltage source Ear_Mic_Bias to the terminal microphone terminal 171. The voltage of the ear microphone bias voltage source, Ear_Mic_Bias may be supplied to the ear microphone 220 via the terminal microphone terminal 171 and the earphone microphone terminal 211. The voltage of the ear microphone bias voltage source Ear_Mic_Bias supplied to the ear microphone 220 through the terminal microphone terminal may be used as energy for operation of the ear microphone 220.

In a process of supplying the voltage of the ear microphone bias voltage source Ear_Mic_Bias to the terminal microphone terminal 171, predetermined amount of electric charges may be charged at the capacitor C connected to the terminal microphone terminal 171. For this, the controller 160 controls to connect the switch element 177 to the capacitor C and the terminal microphone terminal 171. Alternatively, a control terminal, for example a gate terminal of the switch element 177 may be connected to the earphone detection terminal 175 or the comparator Com, as described above. For this, the earphone connection interface 170 may further include a signal line for connecting an output terminal of the comparator Com and the switch element 177.

Accordingly, when a first signal is provided from the earphone detection terminal 175 or the comparator Com, the first signal controls to connect the switch element 177 to the capacitor C and the terminal microphone terminal 171. When a second signal is provided from the earphone detection terminal 175 or the comparator Com, the second signal controls to intercept the switch element 177 from the capacitor C and the terminal microphone terminal 171 and controls to connect the terminal microphone terminal 171 to the ground terminal. Here, a first signal provided by the earphone detection terminal 175 or the comparator Com may correspond to an output signal of the comparator Com using a voltage signal or a corresponding voltage signal in which the pull-up voltage Vdd is dropped to a predetermined voltage as an input voltage according to insertion of the earphone device 200. Further, a second signal provided by the earphone detection terminal 175 or the comparator Com may correspond to an output signal of the comparator Com using a signal in which the pull-up voltage Vdd is supplied to the earphone detection terminal 175 or a corresponding signal as an input signal according to separation of the inserted earphone device 200. The terminal 100 including the earphone connection interface 170 may control a state change of the switch element 177 according to the control of the controller 160.

When the earphone plug 210 of the earphone device 200 is separated from the earphone connection interface 170, the earphone left terminal 214 releases an electrical and physical contact with the earphone detection terminal 175 and the terminal left terminal 174. Thus, when a contact with the earphone detection terminal 175 is released according to movement of the earphone left terminal 214, a pull-up voltage Vdd in which a voltage is not dropped is provided to the earphone detection terminal 175, as described above, and the pull-up voltage Vdd is provided as an input voltage of the comparator Com and thus the controller 160 determines that the earphone device 200 is separated from the earphone connection interface 170 by an output change of the comparator Com. Therefore, the controller 160 controls the switch element 177 disposed between the capacitor C and the terminal microphone terminal 171 to disconnect the capacitor C from the terminal microphone terminal 171. Accordingly, the switch element 177 connects the terminal microphone terminal 171 to the ground terminal through the tuning resistor RT.

As the earphone plug 210 moves from a groove bottom toward an inlet portion of the earphone connection interface 170, the earphone right terminal 213 contacts with the terminal microphone terminal 171, and the earphone left terminal 214 contacts with the terminal ground terminal 172. First, because a signal is not substantially transferred to the earphone left terminal 214 contacting with the terminal ground terminal 172, noise doe not occur in the earphone left output unit 240. Further, because the earphone right terminal 213 is also connected to the ground terminal through the terminal microphone terminal 171, switch element 177, and tuning resistor RT, a signal is not transferred to the earphone right output unit 230 which is electrically connected to the earphone right terminal 213 and thus noise doe not occur. When the switch element 177 does not exist, i.e., in a structure in which the capacitor C is fixedly connected to the terminal microphone terminal 171, the earphone detection terminal 175 recognizes release of insertion of the earphone device 200, and even if a voltage of the ear microphone bias voltage source Ear_Mic_Bias is intercepted, power stored at the capacitor C is not discharged and stands by for a predetermined time period and thus while the earphone plug 210 is separated from the earphone connection interface 170, the earphone plug 210 sequentially contacts with the earphone right terminal 213 and the earphone left terminal 214 through the terminal microphone terminal 171. In this case, because power stored at the capacitor C is transferred to the earphone right terminal 213 and the earphone left terminal 214 through the terminal microphone terminal 171, power corresponding to noise is supplied to the earphone left output unit 240 and the earphone right output unit 230.

At a moment in which the earphone device 200 is released from the earphone connection interface 170 regardless of a discharge time of the capacitor C, the earphone connection interface 170 according to the present exemplary embodiment forms a disconnection state of the capacitor C and the terminal microphone terminal 171. Therefore, even if the earphone right terminal 213 and the earphone left terminal 214 contact with the terminal microphone terminal 171, power stored at the capacitor C is not induced and thus the earphone device 200 controls noise not to occur at the earphone output units 230 and 240.

In the foregoing description, as the earphone device 200 controls the switch element 177 in a process of releasing the earphone device 200 from the earphone connection interface 170, the earphone device 200 controls to connect the terminal microphone terminal 171 to the ground terminal through the tuning resistor RT, however the present invention is not limited thereto. That is, the tuning resistor RT may be removed according to a designer's intention and thus the terminal microphone terminal 171 may be directly connected to a ground terminal according to the control of the switch element 177. Further, the terminal microphone terminal 171 may have a floating state without connection of a separate ground terminal. That is, a configuration of the foregoing tuning resistor RT and ground terminal may be excluded, and only the switch element 177 may be disposed between the terminal microphone terminal 171 and the capacitor C, and the switch element 177 connects the terminal microphone terminal 171 to the capacitor C or releases a connection of the terminal microphone terminal 171 to the capacitor C according to an output of the comparator Com or the control of the controller 160.

As described above, in a process of connecting the earphone device 200, the terminal 100 having the earphone connection interface 170 controls to connect the capacitor C to the terminal microphone terminal 171, and in a process of releasing the earphone device 200, the terminal 100 controls to disconnect the capacitor C from the terminal microphone terminal 171 and thus controls the ear microphone 220 of the earphone device 200 to normally operate while removing or preventing a tick or click noise from occurring by a contact between the terminal microphone terminal 171 and the earphone plug 210.

As described above, the earphone connection interface 170 according to the present exemplary embodiment connects the switch element 177 to the terminal microphone terminal 171 and controls to selectively change a potential of the terminal microphone terminal 171. Particularly, as the earphone connection interface 170 controls a potential of the terminal microphone terminal 171 to be selectively a ground potential, even if an contacts with the terminal microphone terminal 171, the earphone connection interface 170 controls or prevents tick or click noise from occurring in response to a contact of the terminal microphone terminal 171 with earphone right terminal 213 or an earphone left terminal 214.

Figure 5:
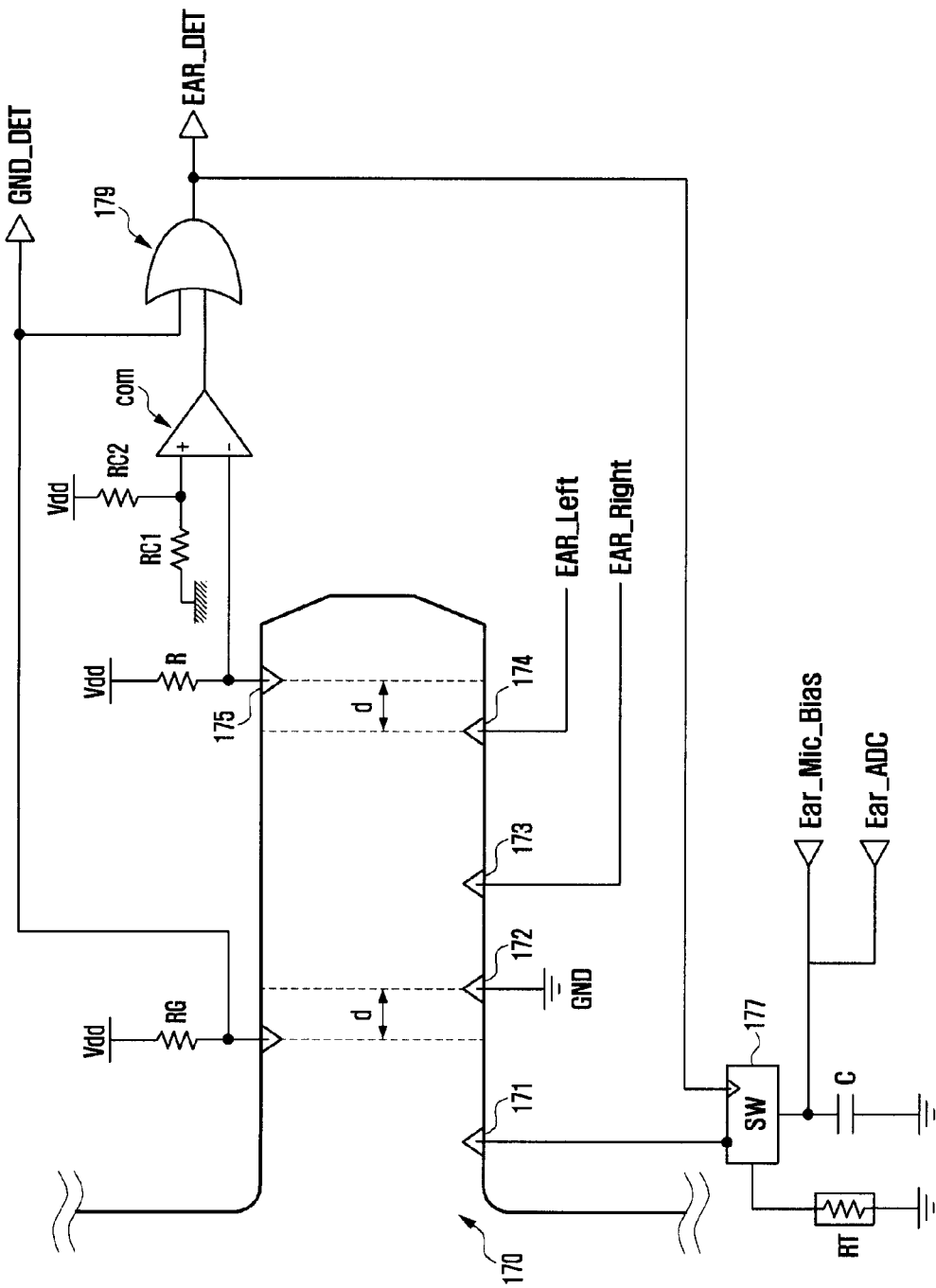
FIG. 5 is a diagram illustrating a form of an earphone connection interface of FIG. 1.
Figure 6:
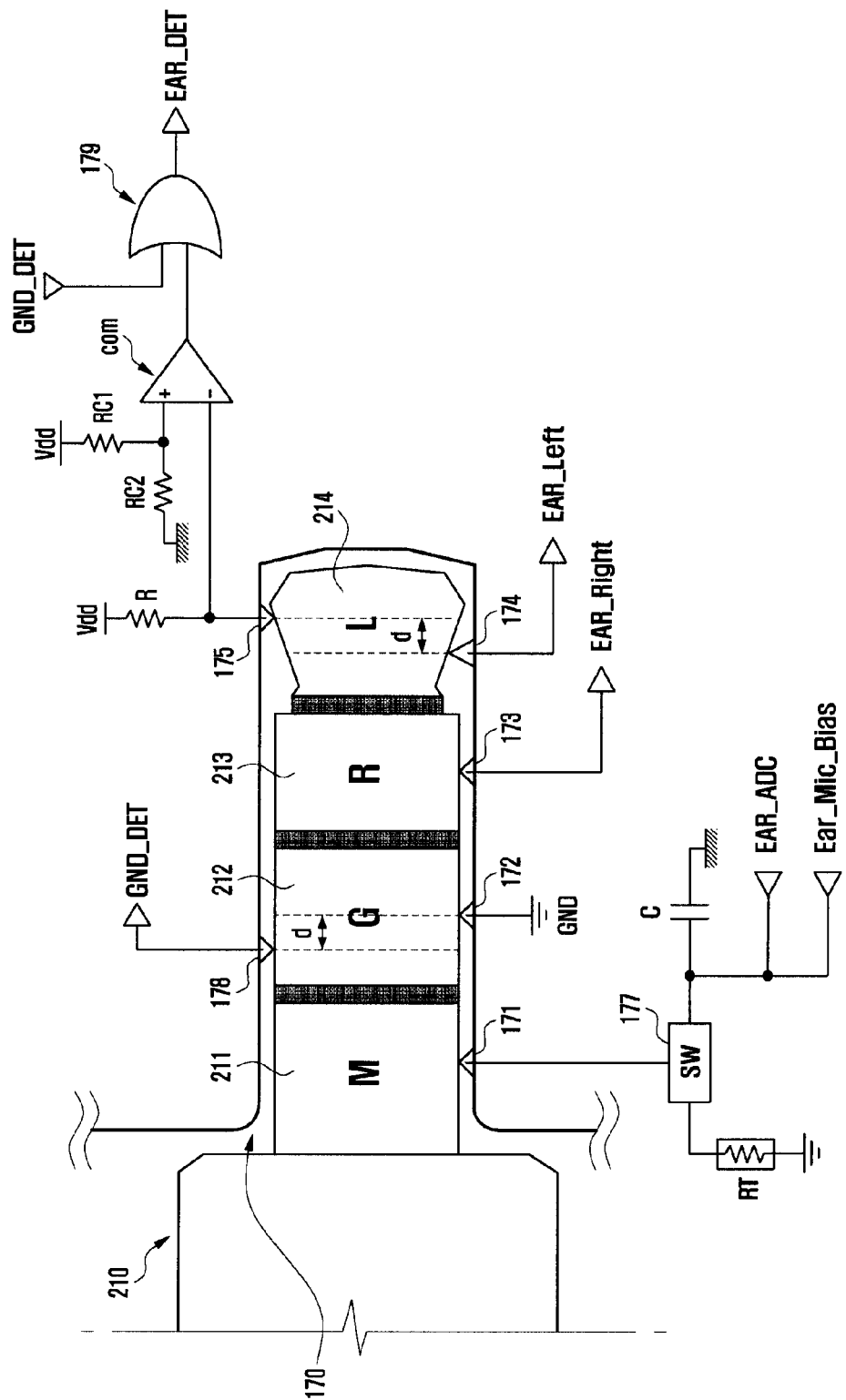
FIG. 6 is a diagram illustrating connections between an earphone plug and an earphone connection interface when an earphone plug is inserted into the earphone connection interface of FIG. 5.
Figure 7:
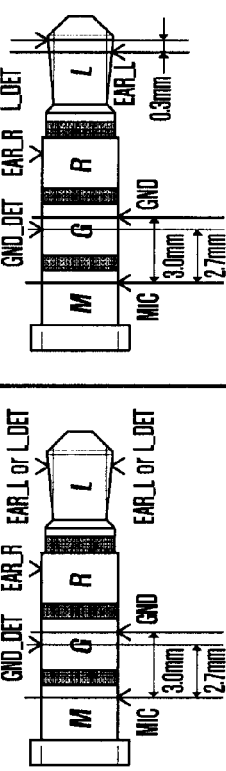
FIG. 7 is a diagram illustrating connections between an earphone plug and an earphone connection interface causing a pop noise occurrence in an earphone connection interface of various forms and graphical representation of a pop noise.
Figure 8:
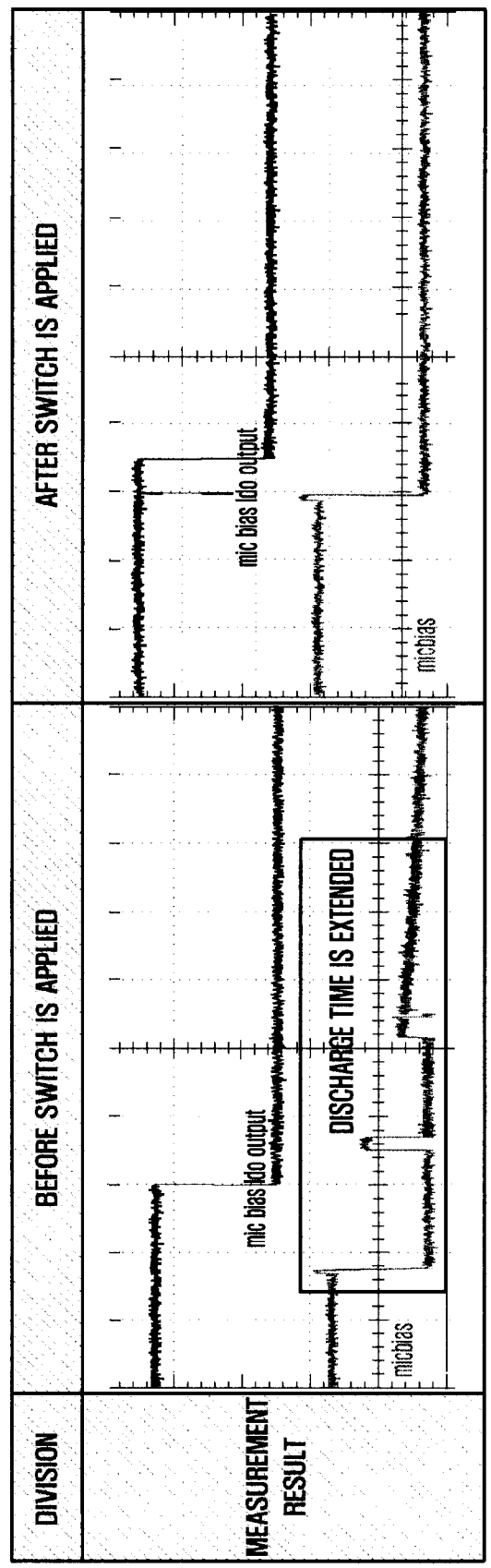
FIG. 8 is a diagram illustrating a graphical representation of a pop noise detection according to application of a switch element.

FIG. 5 is a diagram illustrating the earphone connection interface 170 of the terminal 100 for processing an injected unknown electrically conductive element together with tick noise removal according to another exemplary embodiment of the present invention, FIG. 6 is a diagram illustrating a state in which the earphone plug 210 is inserted into the earphone connection interface 170 of FIG. 5. FIG. 7 is a diagram illustrating a measured result of noise removal according to operation of the earphone connection interface 170 to which tick or click noise removal operation is applied, and FIG. 8 is a diagram illustrating a result according to switch application.

Referring to FIGS. 5 to 8, in the earphone connection interface 170, the terminal microphone terminal 171, terminal ground terminal 172, terminal right terminal 173, and terminal left terminal 174 are sequentially disposed at an inner wall of a cylindrical groove thereof, a terminal ground detection terminal 178 is disposed at area adjacent to the terminal ground terminal 172, and the earphone detection terminal 175 is disposed at an area adjacent to the terminal left terminal 174. Particularly, in the earphone connection interface 170, the terminal left terminal 174 and the earphone detection terminal 175 are separated by a predetermined gap, and the earphone detection terminal 175 is disposed at a preceding position further in a cylindrical groove bottom direction than the terminal left terminal 174. In other words the earphone detection terminal 174 is closer to the opening of earphone connection interface 170 than the earphone detection terminal 175. That is, the earphone detection terminal 175 and the terminal left terminal 174 are each disposed at a position separated by a predetermined distance d based on a depth of a cylindrical groove. Here, a predetermined distance d is designed as, for example, 0.3 mm based on a shape of the earphone plug 210 determined as a standard or typical earphone plug 210. Accordingly, when earphone detection terminal 175 is located a distance d further into the cylindrical groove in the earphone connection interface 170, in a process in which the earphone plug 210 is removed from the earphone connection interface 170, the earphone detection terminal 175 detects removal of the earphone plug 210 earlier due to its more advanced position within earphone connection interface 170 than the earphone left terminal 214.

Further, the terminal ground detection terminal 178 is disposed at a preceding position in an opening direction of a cylindrical groove with respect to the terminal ground terminal 172, in other words, the terminal ground detection terminal 178 is located closer to the opening of the earphone connection interface 170 than the terminal ground terminal 172. That is, the terminal ground detection terminal 178 is disposed between the terminal microphone terminal 171 and the terminal ground terminal 172. Here, the terminal ground detection terminal 178 is disposed at a preceding position by 0.3 mm towards a cylindrical groove opening direction of the earphone connection interface 170 with respect to the terminal ground terminal 172. Accordingly, in a process of removing the earphone plug 210 from the earphone connection interface 170, the terminal ground terminal 172 releases from an electrical contact from the earphone ground terminal 212 earlier than the terminal ground detection terminal 178.

Therefore, a time point at which the earphone detection terminal 175 releases a contact with the earphone left terminal 214 occurs earlier than a time point at which the terminal left terminal 174 releases a contact with the earphone left terminal 214, and a time point at which the terminal ground terminal 172 releases a contact with the earphone ground terminal 212 occurs earlier than a time point at which the terminal ground detection terminal 178 releases a contact with the earphone ground terminal 212. Accordingly, in the terminal microphone terminal 171, the earphone detection terminal 175 detects removal of the earphone plug 210 earlier than a time point at which the terminal microphone terminal 171 contacts with the earphone ground terminal 212 while the terminal microphone terminal 171 releases a physical contact with the earphone microphone terminal 211. In the foregoing description, even in the earphone connection interface 170 to which the terminal ground detection terminal 178 is not applied, the earphone detection terminal 175 may be disposed at a preceding position by a predetermined gap in a cylindrical groove bottom direction than the terminal left terminal 174.

FIG. 7 illustrates a contact overlapping segment of the earphone plug 210 according to a form of the earphone connection interface 170 of FIG. 5.

Referring to FIG. 7, as depicted in the column entitled "Basic Type", when the earphone detection terminal 175 and the terminal left terminal 174 are aligned on the same line and when the terminal ground detection terminal 178 and the terminal ground terminal 172 are aligned on the same line, a pop noise or tick noise may occur. Further, even if the terminal ground detection terminal 178 and the terminal ground terminal 172 are disposed at a position separated by a predetermined distance, for example, 0.3 mm, as depicted in the column entitled "Movement of GND_DET PIN, when the earphone detection terminal 175 and the terminal left terminal 174 are disposed at the same position, a pop noise may occur. Therefore, in order to remove pop noise or tick noise, the earphone connection interface 170 having a form of separation of a predetermined gap between the earphone detection terminal 175 and the terminal left terminal 174 and separation of a predetermined gap between the terminal ground detection terminal 178 and the terminal ground terminal 172 is necessary. Here, the earphone connection interface 170 at which the terminal ground detection terminal 178 is disposed is illustrated in the column entitle MOVEMENT OF GND_DET, L_DET PIN, however the present invention is not limited thereto. That is, when the earphone connection interface 170 uses a structure at which the terminal ground detection terminal 178 is not disposed, for noise removal, only the earphone detection terminal 175 may be disposed in a form separated by a predetermined gap from the terminal left terminal 174.

At the earphone connection interface 170 of the present exemplary embodiment, an OR gate 179 for receiving an input of an output signal of the comparator Com in which a signal according to removal detection of the earphone plug 210, i.e., a signal of the terminal ground detection terminal 178 and a signal of the earphone detection terminal 175 are provided as an input is disposed. The comparator Com uses a potential formed in the earphone detection terminal 175 in which the pull-up voltage Vdd and the pull-up resistor R are connected as a first input voltage and receives a previously defined reference voltage as a second input voltage. Here, the second input voltage may be a value that distributes the pull-up voltage Vdd by a first comparator resistor Rc 1 and a second comparator resistor Rc2. The first comparator resistor Rc 1 and the second comparator resistor Rc2 may be adjusted according to a magnitude of a second input voltage of the comparator Com in agreement with a particular design.

An output of the OR gate 179 is supplied as a control signal of the switch element 177 disposed at the terminal microphone terminal 171. Therefore, in a process of removing the earphone plug 210 from the earphone connection interface 170, the switch element 177 operates by at least one of a signal of the terminal ground detection terminal 178 and a signal of the earphone detection terminal 175. The switch element 177 converts a path to connect a signal line connected to the terminal microphone terminal 171 to a ground terminal. When the switch element 177 is embodied as a field effect transistor (FET), an output of the OR gate 179 is provided to a gate terminal of the switch element 177, and the switch element 177 operates according to an output signal of the OR gate 179. For example, when a signal according to a process of removing the earphone plug 210 from the earphone connection interface 170 is output from the OR gate 179, the switch element 177 intercepts the capacitor C and the ear microphone bias voltage source Ear_Mic_Bias from the terminal microphone terminal 171. Further, when a signal according to an insertion process of the earphone plug 210 is output from the OR gate 179, the switch element 177 connects the capacitor C and the ear microphone bias voltage source Ear_Mic_Bias to the terminal microphone terminal 171. As described above, the switch element 177 removes occurrence of noise by power charged at the capacitor C and suppresses noise that may occur due to the ear microphone bias voltage source Ear_Mic_Bias. When it is designed to quickly intercept power supply of the ear microphone bias voltage source Ear_Mic_Bias in a process of removing the earphone plug 210, noise caused by the ear microphone bias voltage source Ear_Mic_Bias may not occur, but in a control process of the ear microphone bias voltage source Ear_Mic_Bias according to various mechanical tolerances driving tolerances, and design methods, when the earphone plug 210 is removed, in a state in which power supply of the ear microphone bias voltage source Ear_Mic_Bias is not intercepted, the switch element 177 may contact with each terminal of the earphone plug 210. Accordingly, in the present exemplary embodiment, the ear microphone bias voltage source Ear_Mic_Bias is connected to the terminal microphone terminal 171 through the switch element 177 and controls the switch element 177 to intercept a connection of the ear microphone bias voltage source Ear_Mic_Bias and the terminal microphone terminal 171 and thus suppresses noise occurrence by the ear microphone bias voltage source Ear_Mic_Bias.

The terminal microphone terminal 171 has a ground potential according to path conversion of the terminal microphone terminal 171, and in a process of removing the earphone plug 210, even if the earphone plug 210 contacts with the terminal microphone terminal 171, noise that may be occurring according to a connection of the terminal microphone terminal 171 with the earphone plug 210 can be suppressed. That is, as shown in FIG. 8, the earphone connection interface 170 according to the present exemplary embodiment can remove a discharge time of charge power of the capacitor C according to disposition and operation of the switch element 177.

Even in a state in which an unknown electrically conductive element is inserted into the earphone connection interface 170, the terminal ground detection terminal 178 is provided to support a normal operation of the terminal 100. That is, when an unknown electrically conductive element is inserted into the earphone connection interface 170, the unknown electrically conductive element may be disposed within a groove bottom of the earphone connection interface 170. In this case, because the unknown electrically conductive element electrically connects the earphone detection terminal 175 and the earphone left terminal 214, even in a state in which the earphone plug 210 is not inserted into the earphone connection interface 170, the terminal 100 may erroneously recognize that the earphone plug 210 is in a connected state. In order to prevent this, the terminal 100 disposes the terminal ground detection terminal 178 toward a groove opening direction of the earphone connection interface 170 and disposes the pull-up voltage Vdd and the ground pull-up resistor RG at the terminal ground detection terminal 178. Thereafter, an unknown electrically conductive element is inserted into a bottom of the inside of groove, and even if the earphone detection terminal 175 and the earphone left terminal 214 are electrically connected, the terminal 100 determines an actual connection of the earphone plug 210 according to a signal change of the terminal ground detection terminal 178.

For example, even if a signal change corresponding to a state in which the earphone plug 210 is inserted into the earphone detection terminal 175 occurs, when a signal of the terminal ground detection terminal 178 is not changed, the terminal 100 determines that a unknown electrically conductive element is inserted and thus controls to suppress a support of an earphone function. For example, the terminal 100 suppresses conversion of an audio signal path for support of the earphone device 200 and operates at least one of the speaker SPK and the microphone MIC disposed at the terminal 100 according to a corresponding user function.

When a signal change of the earphone detection terminal 175 occurs and a signal change of the terminal ground detection terminal 178 occur, the terminal 100 determines a connection of the earphone plug 210 and thus performs an earphone function. This is, the terminal 100 converts an audio signal path to a function support form of the earphone device 200, outputs an audio signal generated in the terminal 100 to the earphone device 200 through the earphone connection interface 170, and in order to enable the earphone device 200 to support a microphone function according to a kind of the connected earphone device 200, the terminal 100 controls to convert an audio signal path or to use the microphone MIC of the terminal 100.

The foregoing description describes the earphone connection interface 170 in which the earphone detection terminal 175 and the terminal left terminal 174 are disposed in a form separated by a predetermined gap, but the present invention is not limited thereto. That is, the earphone detection terminal 175 and the terminal left terminal 174 may be disposed along an inner wall of the earphone connection interface 170 to be aligned on the same line or opposite to each other, as described with reference to other drawings. In this case, the terminal ground detection terminal 178 and the terminal ground terminal 172 provide the earphone interface 170 to maintain a structure and form wherein the ground detection terminal 178 and the terminal ground terminal are separated by a predetermined gap.

Figure 9:
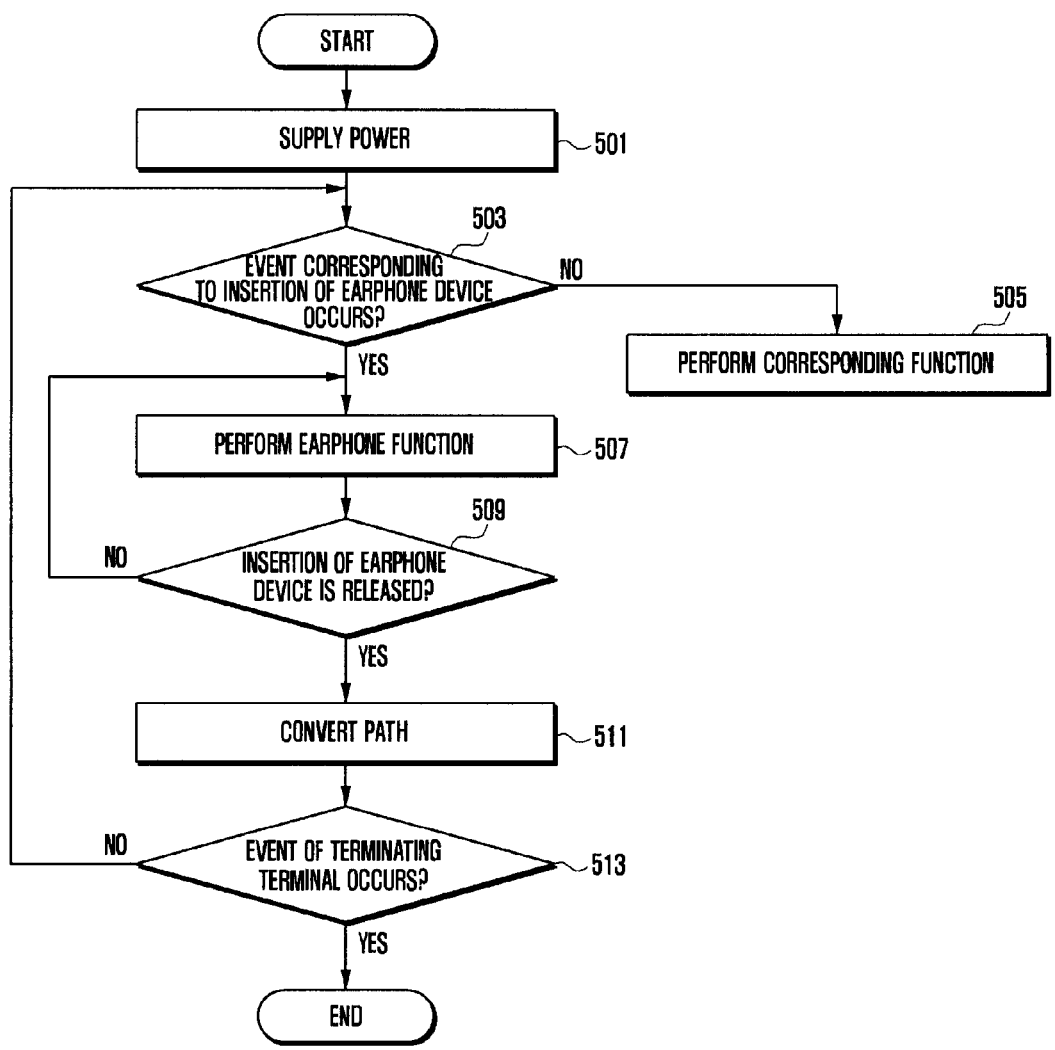
FIG. 9 is a flowchart illustrating a method of operating a terminal of FIG. 1 in accordance with the present invention.

FIG. 9 is a flowchart illustrating a method of operating the terminal 100 for removing a tick noise according to an exemplary embodiment of the present invention.

Referring to FIG. 9, in a method of operating the terminal 100 according to the present exemplary embodiment, the controller 160 supplies necessary power to constituent elements of the terminal 100 using supplied power (501).

The controller 160 determines whether an event corresponding to insertion of the earphone device 200 occurs (503). This is, the controller 160 determines whether an electrical change occurs in the earphone detection terminal 175, as the earphone device 200 is inserted into the earphone connection interface 170.

If an event corresponding to insertion of the earphone device 200 does not occur, the controller 160 performs a corresponding function (505). For example, the controller 160 may perform a function according to a corresponding event such as a communication function, file reproduction function, file search function, file edition function, web connection function, broadcasting reception function, and camera function according to a function of the terminal 100.

If an event corresponding to insertion of the earphone device 200 occurs at step 503, the controller 160 performs an earphone function (507).

This is, the controller 160 determines a kind or type of earphone device 200 that is inserted, i.e., 3-way or 4-way of the earphone device 200, and when the 4-way earphone device 200 is inserted, the controller 160 controls an execution of a function of the ear microphone 220 of the earphone device 200 and a signal processing and power supply for supporting an audio signal output of the earphone output units 230 and 240. Particularly, in order to support a function of the ear microphone 220, the controller 160 controls to supply a voltage of the ear microphone bias voltage source Ear_Mic_Bias to the terminal microphone terminal 171 provided to the earphone connection interface 170. Here, the voltage of the supplied ear microphone bias voltage source Ear_Mic_Bias may be supplied to the capacitor C connected to the terminal microphone terminal 171. For this, the controller 160 controls the switch element 177 to connect the terminal microphone terminal 171 and the capacitor C. Here, as a control terminal of the switch element 177 is connected to the earphone detection terminal 175 or an output terminal of the comparator Com, when a voltage formed in the earphone detection terminal 175 is used as a control signal, if the switch element 177 is inserted into the earphone device 200 without a separate control of the controller 160, a path for connecting the terminal microphone terminal 171 and the capacitor C may be formed.

The controller 160 determines whether insertion of the earphone device 200 is released (509).

If insertion of the earphone device 200 is not released, the process returns to step 507, and the earphone device 200 performs an earphone function.

If insertion of the earphone device 200 is released, the controller 160 converts a circuit path (511). That is, the controller 160 controls the switch element 177 to disconnect the terminal microphone terminal 171 and the capacitor C. In addition, when a ground terminal parallel to the capacitor C is connected to the switch element 177, the controller 160 controls to connect the terminal microphone terminal 171 to the ground terminal. In this process, in a design process, when the tuning resistor RT is additionally disposed, the terminal microphone terminal 171 may be connected to the ground terminal through the tuning resistor RT. When a control terminal of the switch element 177 is connected to the comparator Com connected to the earphone detection terminal 175 or the earphone detection terminal 175 to which the pull-up voltage Vdd is applied, the switch element 177 controls to disconnect or connect the capacitor C and the terminal microphone terminal 171 according to a voltage change of the earphone detection terminal 175 or an output of the comparator Com without the control of the controller 160. That is, as a voltage of the earphone detection terminal 175 is formed as the pull-up voltage Vdd, when an output signal of the comparator Com is a first output signal, for example a high signal, the switch element 177 operates to disconnect the capacitor C and the terminal microphone terminal 171. A voltage lower than the pull-up voltage Vdd is formed in the earphone detection terminal 175 according to insertion of the earphone device 200, and thus when an output signal of the comparator Com is a second output signal, for example a low signal, the switch element 177 operates to connect the capacitor C and the terminal microphone terminal 171. Here, an output of the comparator Com and a state change of the switch element 177 may be designed to change according to a designer's intention. That is, when an output of the comparator Com is high, the switch element 177 may operate to connect the terminal microphone terminal 171 and the capacitor C, and when an output of the comparator Com is low, the switch element 177 may operate to disconnect the terminal microphone terminal 171 and the capacitor C.

The controller 160 determines whether an event of terminating the terminal 100 occurs (513).

If an event of terminating the terminal 100 does not occur, the process continues at step 503.

In the foregoing description, a terminal operation for removal of tick or click noise during operation of the terminal 100 including the earphone connection interface 170 to which the terminal ground detection terminal 178 is not applied. The earphone connection interface 170 to which the terminal ground detection terminal 178 is applied detects a signal change occurring in the terminal ground detection terminal 178 as well as a signal change according to connection and removal of the earphone plug 210 occurring in the earphone detection terminal 175 and thus uses the signal change during operation of the terminal 100 to effect noise removal.

In more detail, at step 503 of determining whether an event corresponding to insertion of the earphone device 200 occurs, the controller 160 determines whether an electrical change of the terminal ground detection terminal 178 occurs together with an electrical change of the earphone detection terminal 175 according to insertion of the earphone device 200 into the earphone connection interface 170. If an event corresponding to insertion of the earphone device 200 occurs at step 503, the controller 160 converts an earphone function to an audio signal path (507). Here, as a control terminal of the switch element 177 is connected to an output terminal of the OR gate 179 connected to an output terminal of the comparator Com and an output terminal of the terminal ground detection terminal 178, when the earphone device 200 is inserted, the switch element 177 forms a path to connect the terminal microphone terminal 171 and the capacitor C without a separate control of the controller 160.

The controller 160 determines whether insertion of the earphone device 200 is released (509).

If insertion of the earphone device 200 is released, the controller 160 controls to connect the terminal microphone terminal 171 to the ground terminal according to path conversion of the switch element 177. In this process, in a design process, when a tuning resistor RT is additionally disposed, the terminal microphone terminal 171 is connected to the ground terminal through the tuning resistor RT. Here, a control signal for circuit path conversion of the switch element 177 corresponds to a potential formed in an output terminal of the OR gate 179, and a path of the switch element 177 may be converted according or in response to an electrical potential change of at least one of the earphone detection terminal 175 and the terminal ground detection terminal 178. In this case, in the earphone connection interface 170, because the earphone detection terminal 175 is disposed at a preceding position further than the terminal left terminal 174 with respect to the earphone left terminal 214, the earphone detection terminal 175 substantially effects an electrical change earlier than the terminal ground detection terminal 178. Such an electrical change changes an output of the comparator Com and thus changes an output of the OR gate 179, and the earphone connection interface 170 according to the present exemplary embodiment enables the terminal microphone terminal 171 to have a ground potential regardless of a signal change according to earphone removal of the terminal ground detection terminal 178.

Figure 10:
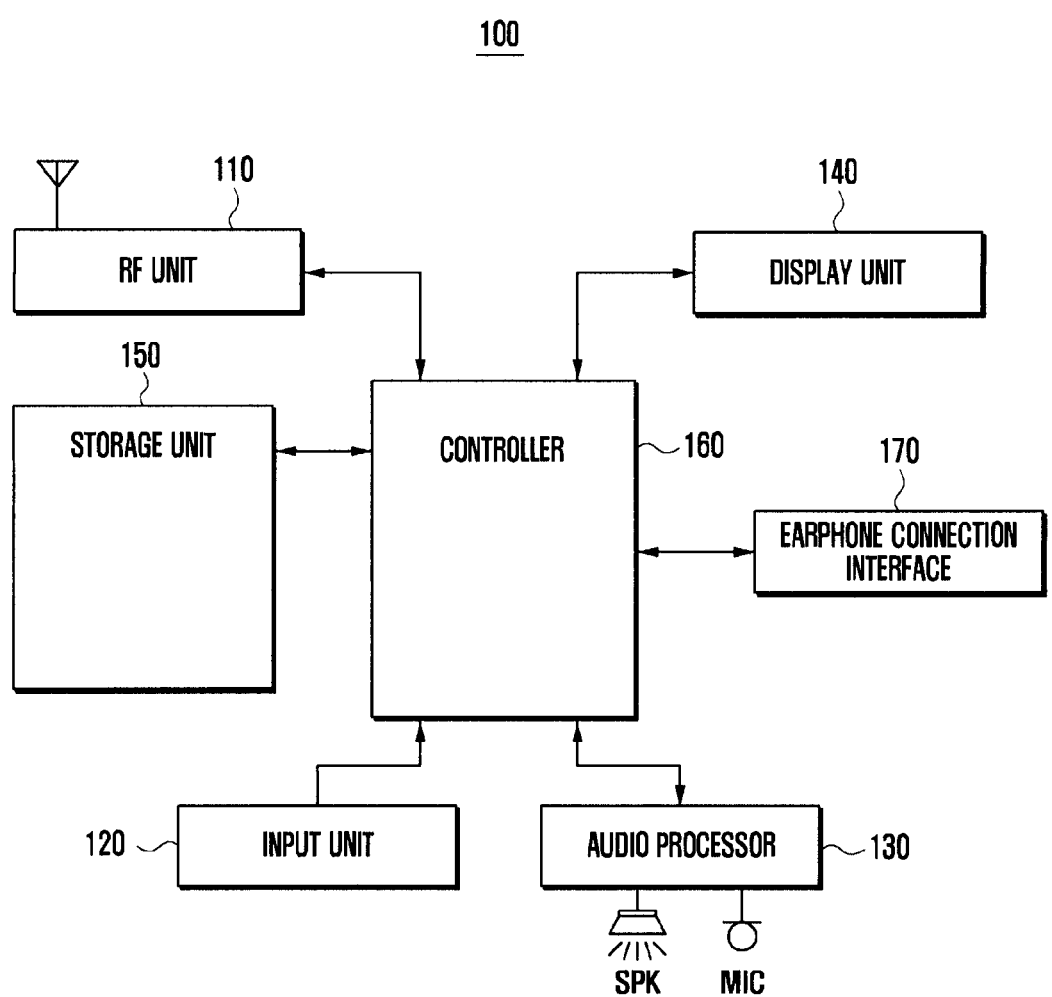
FIG. 10 is a block diagram illustrating a configuration of a terminal of FIG. 1 in accordance with the present invention.

FIG. 10 is a block diagram illustrating a configuration of a terminal of FIG. 1.

Referring to FIG. 10, the terminal 100 according to the present exemplary embodiment includes a radio frequency (RF) unit 110, input unit 120, audio processor 130, display unit 140, storage unit 150, controller 160, and earphone connection interface 170 for inserting the earphone device 200. Here, in constituent elements of the terminal 100, when the terminal 100 does not support a communication function, the RF unit 110 may be omitted. The input unit 120 is used for inputting an input signal for operation of the terminal 100 and may be provided as a button, key, or side key. Here, when the display unit 140 is provided in a touch screen form, the display unit 140 may perform a function of an input unit.

When the earphone device 200 is connected to the earphone connection interface 170, the terminal 100 recognizes insertion of the earphone device 200 and performs a function related to the earphone device 200. In this case, the controller 160 controls the switch element 177 to connect the capacitor C to the terminal microphone terminal 171. When the earphone device 200 is released from the earphone connection interface 170, the controller 160 controls the switch element 177 to disconnect the capacitor C from the terminal microphone terminal 171. Accordingly, in a process of releasing the earphone device 200 from the earphone connection interface 170, even if the earphone left terminal 214 and the earphone right terminal 213 contact with the earphone connection interface 170, the terminal 100 can suppress noise from occurring.

The audio processor 130 includes a speaker SPK for an audio signal output of the terminal 100 and a microphone MIC for collecting an audio signal. When the earphone device 200 is inserted into the earphone connection interface 170, the audio processor 130 controls to turn off a function of the speaker SPK and the microphone MIC and converts a signal path to perform a corresponding function based on the earphone device 200. When the earphone device 200 is removed from the earphone connection interface 170, the audio processor 130 controls to turn on a function of the speaker SPK and the microphone MIC of a main body of the terminal 100. In this case, the audio processor 130 activates at least one of the speaker SPK and the microphone MIC requested by a presently activated user function according to the control of the controller 160.

The display unit 140 outputs various screens according to a user function operation of the terminal 100. Particularly, when the earphone device 200 is inserted into the earphone connection interface 170 or when insertion of the earphone device 200 into the earphone connection interface 170 is released, the display unit 140 may output an alarm or a message. For this, the controller 160 determines at least one of an output value of the comparator Com connected to an earphone detection terminal Ear_DET, an output value of the terminal ground detection terminal 178, and an output of the OR gate 179 that receives the corresponding output value as an input and controls to output an indicator output at a screen upper end portion, a message, or an icon corresponding to a state in which the earphone device 200 is inserted into the earphone connection interface 170 or a state in which the earphone device 200 is removed from the earphone connection interface 170 to the display unit 140

Figure 11:
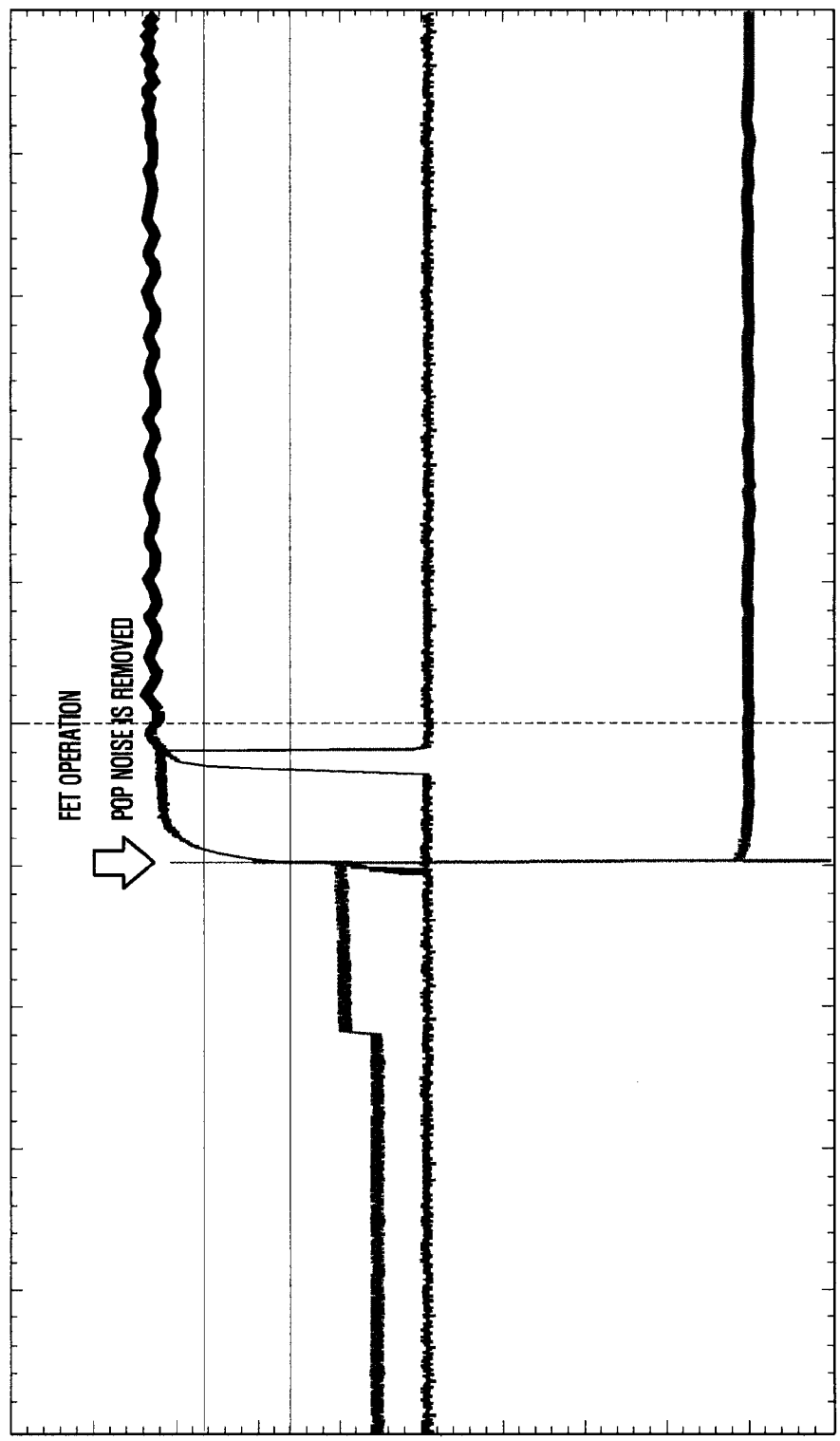
FIG. 11 is a graph illustrating an occurrence of a noise removal measurement result according to an application example of the present invention.
Figure 12:
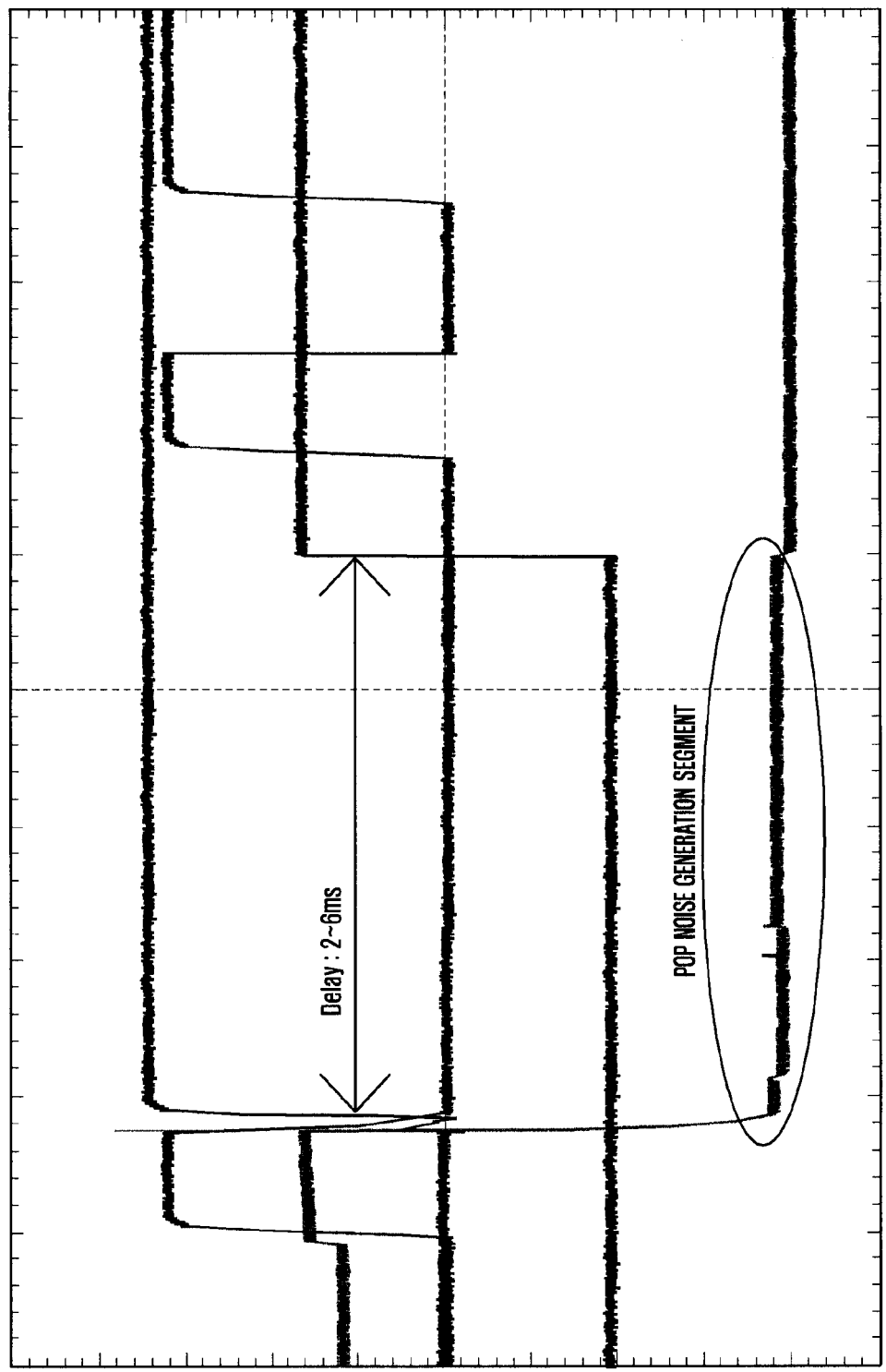
FIG. 12 is a graph illustrating a delay occurrence in a switch element control process according to the present invention.

FIG. 11 is a graph illustrating a state in which a tick or click noise is removed in an earphone plug removing process in the earphone connection interface 170 using an FET switch element according to an exemplary embodiment of the present invention, and FIG. 12 is a graph illustrating delay occurrence in a switch element control process.

After determining removal of the earphone plug 210 from the earphone detection terminal 175 and receiving a signal thereof through a GPIO port provided in the terminal 100, in order to transfer a signal for controlling the switch element 177, in consideration of a time of removing the earphone plug 210 from the earphone connection interface 170, it is necessary to limit a switch control time to a time that is within a predetermined time interval. For example, when a switch control time is limited to a time within 1 ms for the control of the switch element 177, noise may be removed. That is, as shown in FIG. 12, in order to operate the switch element 177, after the earphone plug 210 is removed, when the controller 160 transfers a control signal of the switch element 177, a predetermined time is required and thus in order to remove a corresponding time, a method in which the controller 160 directly controls the switch element 177, except for GPIO operation may be selected. Alternatively, by performing timing for a system operation of the terminal 100 using a faster signal, a control signal provided for the control of the switch element 177 can be quickly transferred and thus a tick or click noise that may occur when removing the earphone plug 210 can be reduced.

The terminal 100 may further include various additional modules according to a providing form. This is, when the terminal 100 is a communication terminal, the terminal 100 may further include constituent elements such as a short range communication module for short range communication, an interface for transmitting and receiving data by a wired communication method or a wireless communication method of the terminal 100, an Internet communication module for performing an Internet function by communicating with an Internet network, and a digital broadcasting module for performing a digital broadcasting reception and reproduction function. Further, a specific constituent element may be excluded from the above constituent elements or replaced with another constituent element according to a providing form of the terminal 100.

Further, the terminal 100 according to an exemplary embodiment of the present invention may include information and communication devices and multimedia devices such as a portable multimedia player (PMP), digital broadcasting player, personal digital assistant (PDA), music player (e.g., MP3 player), mobile game terminal, smart phone, laptop computer, and hand-held PC, and application devices thereof as well as mobile communication terminals operating by communication protocols corresponding to various communication systems.

As described above, in an earphone connection interface, a terminal including the same, and a method of operating the terminal according to the present invention, when an earphone device is released from the earphone connection interface, by preventing tick or click noise from occurring, a user's inconvenience and annoyance by noise can be suppressed.

Although exemplary embodiments of the present invention have been described in detail hereinabove, it should be clearly understood that many variations and modifications of the basic inventive concepts herein described, which may appear to those skilled in the art, will still fall within the spirit and scope of the exemplary embodiments of the present invention as defined in the appended claims. Also, in the following description, well-known functions or constructions may not be described in detail when they would obscure appreciation of the present invention by a person of ordinary skill in the art with unnecessary detail of the well-known functions and structures. Also, the terms used herein are defined according to the functions of the present invention as would be understood by a person of ordinary skill in the art. Thus, the terms may vary depending on user's or operator's intension and usage. That is, the terms used herein must be understood based on the descriptions made herein in view of the ordinary level of skill in the art.

What is claimed is:

1. An earphone connection interface, comprising:
a terminal left terminal, a terminal right terminal, a terminal ground terminal, an earphone detection terminal, and a terminal microphone terminal disposed at an inner wall of a groove;
a switch element for selectively converting an electrical potential of the terminal microphone terminal, the switch element having a control terminal;
a capacitor connected to the terminal microphone terminal through the switch element; and
an ear microphone bias voltage source,
wherein the switch element forms a first circuit path to electrically connect the terminal microphone terminal and the capacitor so that the capacitor is charged by the ear microphone bias voltage source while a voltage of the ear microphone bias voltage source is provided to the terminal microphone terminal, and
wherein the switch element forms a second circuit path to electrically disconnect the terminal microphone terminal and the capacitor so that electric charges of the capacitor are not induced to an earphone device through the terminal left terminal or the terminal right terminal.

2. The earphone connection interface of claim 1, further comprising:
   a pull-up voltage source and a pull-up resistor connected to the earphone detection terminal;
   a comparator connected to the earphone detection terminal, the comparator having an output terminal; and
   a signal line for electrically connecting the output terminal of the comparator with the control terminal of the switch element,
   wherein the ear microphone bias voltage source is connected to the terminal microphone terminal through the switch element.

3. The earphone connection interface of claim 2, wherein the switch element forms the first circuit path in response to a first output signal of the comparator and forms the second circuit path in response to a second output signal of the comparator.

4. The earphone connection interface of claim 2, further comprising a ground terminal connected in parallel with the capacitor to the switch element.

5. The earphone connection interface of claim 4, wherein the switch element forms the first circuit path to electrically disconnect the terminal microphone terminal and the terminal ground terminal in response to a first output signal of the comparator and forms the second circuit path to electrically connect the terminal microphone terminal and the terminal ground terminal in response to a second output signal of the comparator.

6. The earphone connection interface of claim 2, wherein the switch element forms a circuit path to electrically connect the terminal microphone terminal and the capacitor, when the earphone detection terminal comes into electrical contact connection state with an earphone plug of an earphone device and forms a circuit path to electrically disconnect the terminal microphone terminal and the capacitor, when the earphone detection terminal and the earphone plug of the earphone device are in an electrical contact release state.

7. The earphone connection interface of claim 1, further comprising a tuning resistor disposed between the switch element and the terminal ground terminal.

8. The earphone connection interface of claim 1, wherein the earphone detection terminal is disposed at a preceding position by a predetermined distance toward a groove bottom than a position at which the terminal left terminal is disposed.

9. The earphone connection interface of claim 1, further comprising a terminal ground detection terminal disposed between the terminal ground terminal and the terminal microphone terminal and for sensing an electrical change according to an electrical contact with an earphone ground terminal of an earphone plug, when the earphone plug is inserted into the earphone connection interface,
   wherein the switch element operates in response to an electrical change generating in the terminal ground terminal.

10. The earphone connection interface of claim 9, further comprising an OR gate using an output terminal of a comparator which is electrically connected to he earphone detection terminal as a first input and an output terminal of the terminal ground terminal as a second input and wherein the OR gate supplies an output to a control terminal of the switch element.

11. A terminal for operating an earphone device, comprising: an earphone connection interface comprising a terminal left terminal, a terminal right terminal, a terminal ground terminal, an earphone detection terminal, and a terminal microphone terminal disposed at an inner wall of a groove of the earphone connection interface, a capacitor connected to the terminal microphone terminal through the switch element, an ear microphone bias voltage source electrically connected to the terminal microphone terminal and a swtch element connected to the terminal microphone terminal to selectively convert an electrical potential of the terminal microphone terminal; and
   a controller for controlling, an earphone function support of an inserted earphone device when the earphone device is inserted into the earphone connection interface, and controlling to stop an earphone function support of the earphone device, when insertion of the earphone device is released,
   wherein the switch element forms a first circuit path to electrically connect the terminal microphone terminal and the capacitor so that the capacitor is charged by the ear microphone bias voltage source while a voltage of the ear microphone bias voltage source is provided to the terminal microphone terminal, and
   wherein the switch element forms a second circuit path to electrically disconnect the terminal microphone terminal and the capacitor so that electric charges of the capacitor are not induced to the earphone device through the terminal left terminal or the terminal right terminal.

12. The terminal of claim 11, wherein the earphone connection interface further comprises:
   a ground terminal connected to the terminal microphone terminal through the switch element;
   a pull-up voltage source and pull-up resistor electrically connected to the earphone detection terminal;
   a comparator electrically connected to the earphone detection terminal; and
   a signal line for electrically connecting an output terminal of the comparator to a control terminal of the switch element.

13. The terminal of claim 12, wherein the switch element forms the first circuit path in response to a first output signal of the comparator,
   wherein the switch element forms the second circuit path in response to a second output signal of the comparator, and
   wherein the second circuit path comprises connection of the terminal microphone and a ground terminal.

14. The terminal of claim 12, wherein the switch element controls a circuit path to electrically connect the terminal microphone terminal and the capacitor, when the earphone detection terminal and an earphone plug of the earphone device are in electrical contact and forms a circuit path to electrically disconnect the terminal microphone terminal and the capacitor, when the earphone detection terminal and an earphone plug of the earphone device are in an electrical contact release state.

15. The terminal of claim 11, wherein the earphone connection interface further comprises:
   an ear microphone bias voltage source connected to the terminal microphone terminal and a ground terminal or a capacitor connected to the terminal microphone terminal through the switch element;
   a pull-up voltage source and pull-up resistor electrically connected to the earphone detection terminal;
   a comparator electrically connected to the earphone detection terminal; and
   an output signal line for electrically connecting the controller and an input control terminal of the switch element.

16. The terminal of claim 15, wherein the controller controls the switch element to electrically disconnect the terminal microphone terminal from the capacitor and controls to electrically connect the terminal microphone terminal to the terminal ground terminal, when insertion of the earphone device is released from the earphone connection interface.

17. The terminal of claim 15, wherein the controller determines insertion or insertion release of the earphone device with the earphone connection interface in response to an output change of the comparator and controls the switch element to electrically connect the terminal microphone terminal to the capacitor, when the earphone device is inserted into the earphone connection interface.

18. The terminal of claim 11, wherein the earphone detection terminal is disposed at a preceding position by a predetermined distance along a cylindrical groove bottom with respect to a position at which the terminal left terminal is disposed along the cylindrical groove bottom.

19. The terminal of claim 11, wherein the earphone connection interface further comprises a terminal ground detection terminal disposed along a cylindrical groove bottom of the earphone connection interface between the terminal ground terminal and the terminal microphone terminal for sensing an electrical change in response to an electrical contact with an earphone ground terminal of an earphone plug, when the earphone plug is inserted into the earphone connection interface, and wherein the switch element operates in response to an electrical change occurring in the terminal ground terminal.

20. The terminal of claim 19, wherein the earphone connection interface further comprises an OR gate using an output terminal of a comparator which is connected to the earphone detection terminal as a first input and an output terminal of the terminal ground terminal as a second input and wherein the OR gate supplies an output to a control terminal of the switch element.

21. A method of operating a terminal, the method comprising:

controlling a switch element to electrically connect a terminal microphone terminal and a capacitor so that the capacitor is charged by an ear microphone bias voltage source while a voltage of the ear microphone bias voltage source is provided to the terminal microphone terminal, the terminal microphone terminal disposed along an inner wall of a groove of an earphone connection interface; and controlling the switch element to electrically disconnect the terminal microphone terminal and the capacitor so that electric charges of the capacitor are not induced to an earphone device through a terminal left terminal or a terminal right terminal.

22. The method of claim 21, wherein the earphone connection interface further comprises a ground terminal electrically connected parallel to the capacitor with the switch element, wherein controlling the switch element to connect the terminal microphone terminal and the capacitor comprises controlling to release an electrical connection of the terminal microphone terminal and the ground terminal, when the earphone device is inserted into the earphone connection interface, and wherein controlling the switch element to disconnect the terminal microphone terminal and the capacitor comprises controlling to electrically connect the terminal microphone terminal and the ground terminal, when insertion of the earphone device is released from the earphone connection interface.

23. The method of claim 21, wherein controlling the switch element to connect the terminal microphone terminal and the capacitor comprises converting a state of the switch element in response to at least one of an output of an earphone detection terminal for detecting insertion of the earphone device within the earphone connection interface in response to insertion of the earphone device, an output of a comparator connected to the earphone detection terminal, and an output of a terminal ground detection terminal having an electrical change in response to insertion of the earphone device.

24. The earphone connection interface of claim 1, further comprising:

a signal line for transferring at least one of an output of the earphone detection terminal and an output of a comparator electrically connected to the earphone detection terminal to the control terminal of the switch element.

25. The earphone connection interface of claim 24, wherein the switch element forms the second circuit path to electrically connect the terminal microphone terminal with a ground terminal in response to an output change of the earphone detection terminal and wherein the first circuit path comprises electrical disconnection of the terminal microphone terminal and the terminal ground terminal.

26. The earphone connection interface of claim 25, further comprising at least one of:

a terminal ground detection terminal for sensing an electrical change in response to an electrical contact with an earphone plug, when the earphone plug is inserted into the earphone connection interface; and an OR gate using an output terminal of a comparator which is electrically connected to the earphone detection terminal as a first input and an output terminal of a terminal ground detection terminal as a second input and wherein the OR gate supplies an output to a control terminal of the switch element, wherein the switch element grounds the terminal microphone terminal in response to at least one of an output of the terminal ground detection terminal and an output of the OR gate.

* * * * *

UNITED STATES PATENT AND TRADEMARK OFFICE
CERTIFICATE OF CORRECTION

PATENT NO.         : 9,538,276 B2                                        Page 1 of 1
APPLICATION NO.    : 13/975595
DATED              : January 3, 2017
INVENTOR(S)        : Garam Yu et al.

It is certified that error appears in the above-identified patent and that said Letters Patent is hereby corrected as shown below:

In the Claims

Column 20, Claim 11, Line 6 should read as follows:
--...and a switch element...--

Signed and Sealed this
Twenty-eighth Day of February, 2017

Michelle K. Lee
*Director of the United States Patent and Trademark Office*